Oct. 7, 1969   E. B. CARLTON   3,470,632
SNOW PLOW HAVING A VEHICLE RAMP
Filed Sept. 23, 1966   2 Sheets-Sheet 1

INVENTOR.
Emerson B. Carlton
BY
Ashlan F. Harlan Jr.
ATTORNEY.

Oct. 7, 1969 E. B. CARLTON 3,470,632
SNOW PLOW HAVING A VEHICLE RAMP
Filed Sept. 23, 1966 2 Sheets-Sheet 2
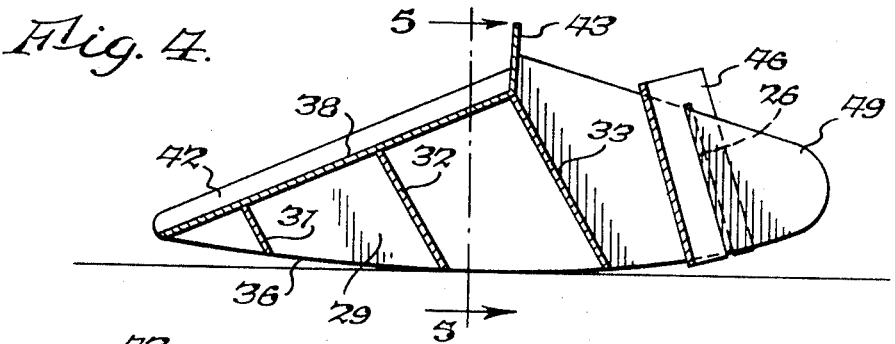
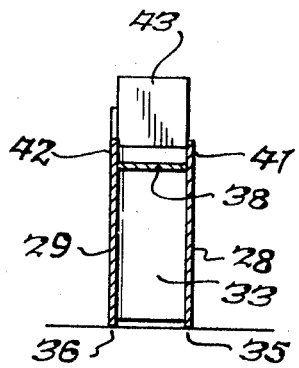
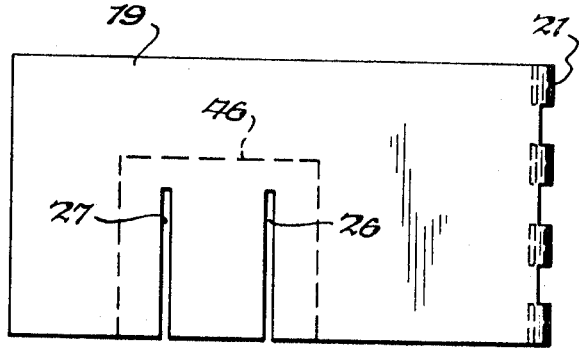
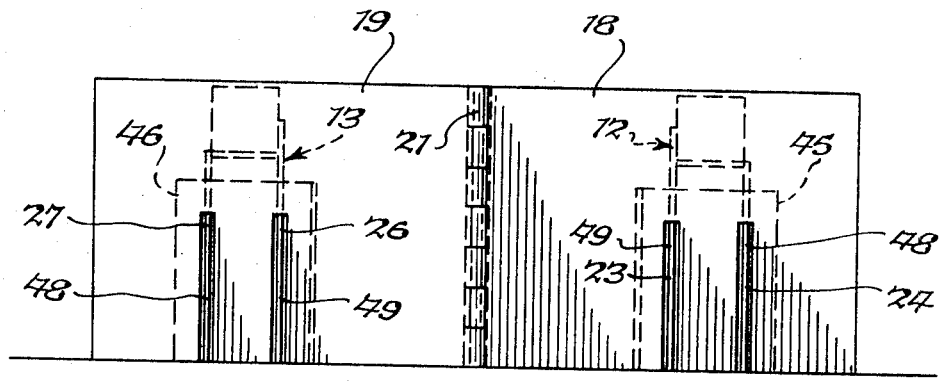
INVENTOR.
Emerson B. Carlton
BY
Ashlan F. Harlan Jr.
ATTORNEY.

United States Patent Office 3,470,632
Patented Oct. 7, 1969

3,470,632
SNOW PLOW HAVING A VEHICLE RAMP
Emerson B. Carlton, 942 Elliott Drive,
Lewiston, N.Y. 14092
Filed Sept. 23, 1966, Ser. No. 581,563
Int. Cl. E01h 5/06
U.S. Cl. 37—44                             8 Claims

ABSTRACT OF THE DISCLOSURE

A detachable snow plow for vehicles such as automobiles which comprises a pair of sleds adapted to receive and support the front wheels of the vehicle and a V-shaped blade removably carried by said sleds, each of said sleds comprising a ramp onto which the vehicle wheel may be driven, a stop plate at the forward end of said ramp, and guide rails extending above said ramp.

---

This invention relates to snow plows and particularly to snow plows adapted for convenient use with a vehicle.

It is an object of this invention to provide a snow plow that is readily useable in combination with a vehicle such as a passenger automobile.

It is a further object of this invention to provide a snow plow which can rapidly and easily be placed in use.

It is a further object of this invention to provide a snow plow which can be produced inexpensively and which can be used in combination with vehicles without the necessity of expensive means for attaching said snow plow to said vehicle.

Still another object of the invention is to provide a snow plow that can be propelled by an automobile without being firmly attached thereto.

Other objects and advantages of this invention will be apparent from a consideration of the specification, the appended claims, and the accompanying drawings in which:

FIGURE 3 is a front view of the snow plow shown in FIGURE 1;

FIGURE 4 is a longitudinal section taken on line 4—4 of FIGURE 2;

FIGURE 5 is a transverse section of the portion of the plow shown in FIGURE 4 taken on line 5—5; and FIGURE 6 is a front view of one section of the plow blade.

Figures 1, 2:
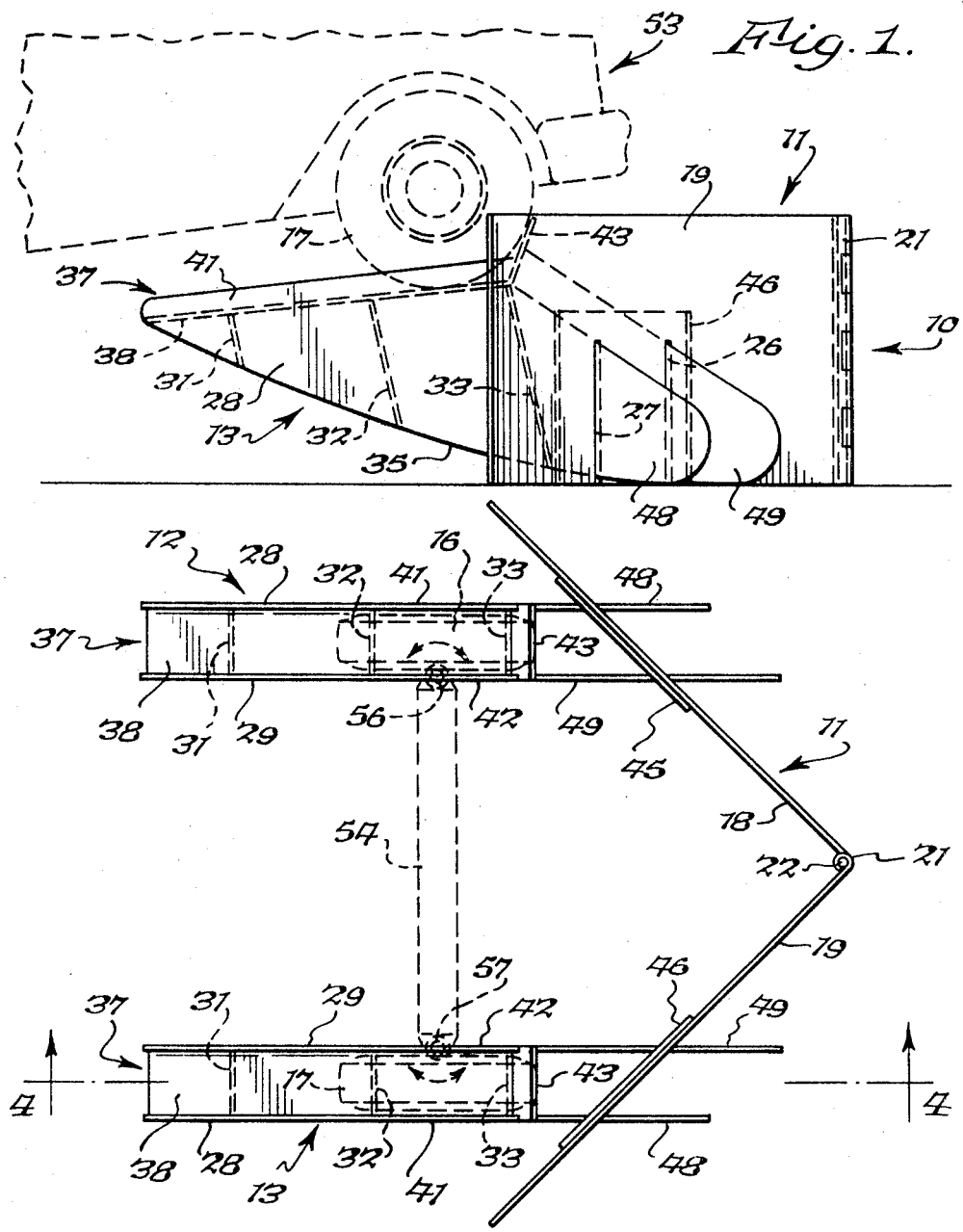
FIGURE 1 is a side elevational view of a snow plow in accordance with this invention, showing the plow in association with a vehicle.
FIGURE 2 is a top plan view of the snow plow of FIGURE 1.

The foregoing objects and advantages are achieved by providing a snow plow having a V-shaped blade detachably carried by a pair of sleds, each of said sleds being adapted for supporting a vehicular wheel and for being propelled by said vehicle through said wheel.

The details of this invention will be more fully understood by referring to the accompanying drawing which shows a snow plow in accordance with this invention. This novel plow includes a V-shaped blade comprehensively designated 11 detachably carried by a pair of sleds 12 and 13. Sleds 12 and 13 are also adapted for supporting vehicular wheels 16 and 17, respectively, and for being propelled by means of said wheels as will be more fully described hereinafter.

The V-shaped blade 11 consists of two substantially flat blade sections 18 and 19 which are formed at their adjacent edges with hinge portions 21 and are held together pivotally by a hinge pin 22. Blade sections 18 and 19 are each provided with slots 23, 24 and 26, 27, respectively, extending upwardly from their lower edges, for removably mounting the blade 11 on the sleds 12 and 13.

The sled 12 comprises an outer side plate 28 and a somewhat longer, inner side plate 29 spaced apart and rigidly connected together by generally upright cross-members or struts 21, 32 and 33 which may conveniently be welded to the side plates. Each of the side plates 28 and 29 is of generally triangular configuration but the bottom edges thereof, 35 and 36, respectively, are arcuate and have radiused junctions with the other two edges of the respective plates. A ramp 37 is provided on sled 12 by securing a ramp plate 38 between the side plates 28 and 29 and to the upper ends of cross members 31, 32 and 33. The ramp plate 38 is substantially parallel to the rear upper edges of side plates 28 and 29 and is spaced inwardly from said edges whereby said edges form a pair of spaced guide rails 41 and 42. The inner end of the ramp 37 terminates at approximately the apices of side plates 28 and 29 and is there provided with an upwardly extending stop plate 43 which is preferably secured to the side plates, to ramp plate 38, and to crossmember 33 for strength and rigidity.

The sleds 12 and 13 are provided adjacent their forward ends with blade rest plates 45 and 46, respectively. Each of the plates 45 and 46 is preferably rectangular in shape and is provided with laterally spaced slots for reception of the portions 48 and 49 of the side plates 28 and 29, respectively, that extend forwardly from the ramp plates 38. The blade rest plates, which are secured to the sleds by suitable means, are disposed at about a 45° angle to the plates of the side plates 28 and 29 with the outer edge thereof rearwardly disposed. It will be seen that the sleds 12 and 13 are preferably substantially identical in construction. However, each is the mirror image of the other so that the planes of blade rest plates 45 and 46, in use, converge at a line midway between the sleds 12 and 13.

As mentioned above, the blade 11 is detachably carried by the sleds 12 and 13. The forward portions 48 and 49 of the side plates of the sleds pass through the slots provided in the blade sections 18 and 19 so that said sections bear against the respective blade stop plates 45 and 46.

When the plow is not in use, the blade 11 may be folded. It and the two sleds 12 and 13 may then be conveniently handled and stored. To set it up for use, it is only necessary to open out the blade 11 and place the slots in the blade sections over the forwardly projecting ends 48 and 49, respectively, of the side plates 28 and 29 of the sleds. It will be understood that the span between the sleds is determined by the location and spacing of slots 48 and 49 and this will, according to the preferred embodiment of the invention, be such that the ramps 37 of the aligned sleds are adapted to receive the unpowered (usually front) wheels 16 and 17 of an automobile 53.

In using the snow plow of this invention, the non-powered wheels 16 and 17 are positioned on the ramps 37 against the stop plates 43 by driving the wheels up the ramps. Propulsion of the snow plow is then achieved by driving the vehicle forward, thus causing wheels 16 and 17 to push against the stop plates 43. Sleds 12 and 13 are thereby caused to pivot or rock forwardly on the arcuate bottom edges 35 and 36 of the sled side plates whereby, as shown best in FIGURE 1, to shift the surface contact points of said side plates forwardly of blade 11 on the projecting portions 48 and 49 of said side plates. The blade 11, as shown in FIGURES 1 and 2, is urged forwardly by the blade rest plates 45 and 46 carried by the sleds 12 and 13 and displaces snow to either side of the vehicle. Since they extend a substantial distance beyond the sides of the sleds, the plates 45 and 46 also serve to prevent or minimize the passage of snow through the slots 23, 24, 26 and 27 of the blade.

A certain amount of steerability can be achieved using the novel snow plow of this invention when, as is shown in FIGURE 2, the wheels 16 and 17 carried by the sleds 12 and 13 are the steering wheels of vehicle 53. As is shown in the drawing, the wheels 16 and 17 are positioned on the sleds 12 and 13 against the stop plates 43. The wheels 16 and 17, as shown by the arrows thereon, are steerably mounted on axle 54 with kingpins 56 and 57, respectively, and are steerable by conventional means (not shown). As steering action is applied, wheels 16 and 17 act against guide rails 41 and 42 in the direction of the turn, causing sleds 12 and 13 to pivot in that direction and to carry the blade 11 therewith. Blade slots 23, 24, 26 and 27 are preferably of sufficient width to allow a limited amount of turning of said sleds. However, these slots should not be so wide as to allow too much play between blade 11 and sleds 12 and 13 since control of the snow plow would thereby be made difficult.

When plowing has been completed along a given path, the vehicle is backed away from blade 11. This shift in weight causes sleds 12 and 13 to pivot back, off of extending portions 48 and 49 of said sleds, thereby lowering the ramps 37 so that the vehicle is readily removed from the sleds. The vehicle and plow can then be taken back and another path adjacent to the first may, if desired, be plowed in the same manner as described above. In many cases, however, such as in the clearing of a private driveway from a garage to the street, one pass with the plow will be sufficient since the plow blade is wider than the track of the automobile. Thus, if the automobile is placed in the garage with the front wheels by the door, it will be quite easy to clear the drive from accumulated snow as the automobile is driven to the street.

As will be apparent, the novel snow plow of this invention is easily associated with a vehicle for plowing since the plow is ready for use when the unpowered vehicle wheels are driven on to the sled ramps. The resistance caused by the sleds is minimized since, during use, the sleds contact the surface ahead of the blade on portions 48 and 49, thus causing the sleds to run over snow rather than over the plowed surface.

Snow plows according to the present invention may be formed of any strong sheet material although metal is generally most suitable. The sleds 12 and 13 are preferably constructed from metal plates of the desired size and shape by welding. However, by proper design, well known in the art, they can be assembled with rivets or in other desired ways. For durability, it will ordinarily be desired to form the plow blade of rather heavy gauge metal.

Snow plows made according to this invention are relatively inexpensive to manufacture, require little or no maintenance, and are easy to use. When not in use, these novel snow plows can be readily disassembled and stored.

It will be understood that the invention is not to be considered as limited to the precise construction illustrated and described since many modifications and variations may be made in the construction without departing from the spirit of the invention. For example, if desired, additional reinforcing members may be used on the sleds or the blade where unusually heavy service may be required. Further, if desired, the blade shape may be varied and, when the economy in space achieved with a folding blade is not important, may be of rigid, one-piece construction. Also, of course, the size and spacing of the parts may be changed to provide for use with vehicles of different construction. Furthermore, it is not to be inferred that plows according to the invention are exclusively for use with automobiles since they may be employed with any wheeled vehicle, including unpowered ones which are propelled by other means such as a push rod.

Accordingly, it is intended that the invention shall be construed as broadly as permitted by the appended claims.

I claim:
1. A snow plow comprising a blade and a pair of sleds detachably carrying said blade, each of said sleds being adapted for supporting a vehicular wheel and for movement imparted thereto through said wheel, said sleds, respectively, comprising a pair of laterally spaced side plates of generally triangular configuration and having arcuate bottom edges whereby said sleds may pivot forwardly to bring the point of contact of said bottom edges of said sleds forwardly of said blade, a ramp extending between said slide plates, said ramp being adapted for receiving and supporting a vehicle wheel, and a stop plate at the forward end of said ramp.

2. The snow plow of claim 1 wherein said blade is V-shaped.

3. The snow plow of claim 2 wherein said V-shaped blade consists of two generally vertical sections pivotally connected at their adjacent ends, each section being provided with a pair of slots extending upwardly from the lower edge thereof and wherein portions of one of said sleds extend through said slots in each of said sections and project forwardly of said blade.

4. The snow plow of claim 2 wherein each of said sleds is provided with a blade rest plate arranged at an angle to the longitudinal axis of said sled equal to the angle at which said blade section intersects said sled whereby said blade may be propelled by said sleds.

5. The snow plow of claim 3 wherein each of said sleds consists of a pair of laterally spaced side plates of generally triangular configuration, a ramp extending between said slide plates, said ramp being adapted for receiving and supporting a vehicle wheel and a stop plate at the forward end of said ramp.

6. A snow plow comprising a blade and a pair of sleds detachably carrying said blade, each of said sleds being adapted for supporting a vehicular wheel and for movement imparted thereto through said wheel and comprising a pair of laterally spaced side plates of generally triangular configuration, said side plates being connected together and spaced apart by a plurality of generally upright crossmembers located therebetween, a ramp comprising a ramp plate extending between said side plates and supported by said cross members, said ramp being adapted for receiving and supporting a vehicle wheel, and a stop plate at the forward end of said ramp.

7. The snow plow of claim 6 wherein said side plates of each of said sleds extend above said ramp plate thereby forming guide rails.

8. The snow plow of claim 6 wherein each of said sleds is provided with a blade rest plate arranged at an angle to the longitudinal axis of said sled equal to the angle at which said blade section intersects said sled whereby blade may be propelled by said sleds.

References Cited
UNITED STATES PATENTS

| | | | |
|---|---|---|---|
| 1,392,166 | 9/1921 | Immer | 37—42 |
| 1,694,215 | 12/1928 | Golembiewski | 280—12 |
| 3,087,266 | 4/1963 | McEvoy | 37—42 |
| 1,711,488 | 5/1929 | Bising | 37—44 |
| 2,345,460 | 3/1944 | Coderre | 37—46 |

ROBERT E. PULFREY, Primary Examiner

EUGENE H. EICKHOLT, Assistant Examiner

U.S. Cl. X.R.

37—46